Patented Sept. 8, 1931

1,822,351

UNITED STATES PATENT OFFICE

CARL KRAUCH, OF LUDWIGSHAFEN-ON-THE-RHINE, AND MATHIAS PIER AND AUGUST EISENHUT, OF HEIDELBERG, GERMANY, ASSIGNORS, BY MESNE ASSIGNMENTS, TO STANDARD-I. G. COMPANY, OF LINDEN, NEW JERSEY, A CORPORATION OF DELAWARE

PURIFICATION OF HYDROGENATION PRODUCTS OF CARBONACEOUS MATERIALS

No Drawing. Application filed August 13, 1926, Serial No. 129,094, and in Germany August 20, 1925.

The purification of products of destructive hydrogenation of carbonaceous materials such as coal, tars, mineral oils and the like can generally be effected only with difficulty.

We have now found that the valuable components which consist chiefly of saturated hydrocarbons can be separated from such products of destructive hydrogenation which, if desired, are previously freed from benzine-like fractions, by treating the said products with crude synthetic methanol which may contain other organic compounds, for example dimethyl ether, formic and acetic acid, iron carbonyl, higher alcohols, aldehydes, ketones and the like, and which may be obtained for example by the catalytic reduction of carbon monoxid with hydrogen under pressure. By the said treatment the hydrogenation products are refined to a very considerable extent and freed from impurities, so that the resulting products are very valuable commercially since they are suitable for example for use as lubricating oils.

The process according to the present invention can be applied to all kinds of products of destructive hydrogenation of carbonaceous materials, for example those obtained from mineral coal, brown coal (lignite), peat, wood or their distillation or extraction products alone or in mixture with each other, or from oils of organic or mineral origin, residues thereof, resins, bitumina of any kind and the like.

The treatment of the products of destructive hydrogenation with the methanol can be carried out in any suitable manner, for example by intimately mixing and subsequently allowing the alcoholic layer to settle and separating it. It is of special advantage to effect the treatment in a counter-current, for example by introducing the hydrogenation product into the upper part and the methanol into the lower part of a column or tower filled with so-called Raschig rings or other indifferent materials. The purified product can be withdrawn at the bottom of the column or tower, while the methanol charged with the impurities leaves the apparatus at the top.

The following examples will further illustrate how our invention may be carried out in practice, but the invention is not limited to these examples.

Example 1

Distillation residues of destructively hydrogenated brown coal producer tar are freed from paraffines and treated with methanol until all soluble matter is removed therefrom. Thereby a product is obtained in a yield of about 40 per cent which consists practically completely of hydrocarbons free from oxygen. All tarry oxygen-containing components of the initial material are dissolved by the methanol.

Example 2

Distillation residues of a product of destructive hydrogenation of the distillation residues of Russian crude mineral oil and brown coal are freed from paraffines, if necessary, and washed with methanol in a counter-current. Thereby a purified product is obtained with a yield of about 60 per cent which is very valuable for use as a lubricating oil.

What we claim is:

1. The process of purifying hydrogenation products of carbonaceous materials of high boiling point which comprises treating the said products with crude synthetic methanol obtained by the catalytic reduction of oxids of carbon with hydrogen.

2. The process of purifying the products of destructive hydrogenation of carbonaceous materials which comprises treating the said products with crude methanol obtained by the catalytic reduction of oxids of carbon with hydrogen.

In testimony whereof we have hereunto set our hands.

CARL KRAUCH.
MATHIAS PIER.
AUGUST EISENHUT.